US012802470B2

(12) United States Patent
Thi et al.

(10) Patent No.: US 12,802,470 B2
(45) Date of Patent: Nov. 17, 2026

(54) AUTOMATED PHENOTYPIC ANALYSIS OF MICROSCOPIC IMAGES USING A CASCADE ML ARCHITECTURE WITH ITERATIVE ACTIVE LEARNING

(71) Applicant: Microsoft Technology Licensing, LLC, Redmond, WA (US)

(72) Inventors: Hue Tuan Thi, Bellevue, WA (US); Gayathri Mahalingam, Bothell, WA (US); Julia T. Chen, Bellevue, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 18/581,830

(22) Filed: Feb. 20, 2024

(65) Prior Publication Data

US 2025/0265849 A1 Aug. 21, 2025

(51) Int. Cl.
*G06V 20/69* (2022.01)
*G06V 20/70* (2022.01)

(52) U.S. Cl.
CPC ............ *G06V 20/695* (2022.01); *G06V 20/70* (2022.01)

(58) Field of Classification Search
CPC ............................ G06V 20/695; G06V 20/70
See application file for complete search history.

(56) References Cited

U.S. PATENT DOCUMENTS

| | | | | |
|---|---|---|---|---|
| 8,705,834 | B2 * | 4/2014 | Kask | G06V 20/695 382/173 |
| 9,677,109 | B2 * | 6/2017 | Shamsheyeva | G16B 5/00 |
| 10,293,006 | B2 * | 5/2019 | Embree | A23K 10/18 |
| 10,521,910 | B2 * | 12/2019 | Wiles | C12M 23/10 |
| 10,696,938 | B2 * | 6/2020 | Wiles | G06V 20/698 |
| 10,947,576 | B2 * | 3/2021 | Tao | C12Q 1/18 |
| 11,319,575 | B2 * | 5/2022 | Marcelpoil | G06T 7/0016 |
| 12,505,549 | B1 * | 12/2025 | Koller | G16B 40/20 |
| 2004/0229210 | A1 * | 11/2004 | Sabry | G01N 15/1433 435/6.16 |
| 2009/0111101 | A1 * | 4/2009 | Tafas | G01N 1/312 435/6.11 |
| 2014/0093911 | A1 * | 4/2014 | Sun | G06V 20/695 435/39 |
| 2014/0278136 | A1 * | 9/2014 | Shamsheyeva | G06T 7/0016 702/19 |
| 2015/0225762 | A1 * | 8/2015 | Metzger | C12Q 1/04 435/23 |
| 2016/0341731 | A1 * | 11/2016 | Sood | G16B 40/00 |
| 2018/0310592 | A1 * | 11/2018 | Embree | A23K 10/18 |
| 2018/0357507 | A1 * | 12/2018 | Gelbman | G06V 10/82 |
| 2019/0390246 | A1 * | 12/2019 | Embree | A23K 10/16 |
| 2022/0172496 | A1 * | 6/2022 | Wilkinson, Jr. | G06V 10/774 |

(Continued)

*Primary Examiner* — Mohammed H Zuberi
(74) *Attorney, Agent, or Firm* — Ray Quinney & Nebeker P.C.; Tiffany B. Healy

(57) ABSTRACT

The present disclosure relates to systems and methods for automated phenotypic analysis of microscopic images using a cascade machine learning architecture with iterative active learning. The systems and methods include a cascading flow of data through a plurality of machine learning models from images to specific phenotypic detection. The systems and methods use a feedback loop for continually improving the predictions of the plurality of machine learning models.

19 Claims, 4 Drawing Sheets

(56) References Cited

U.S. PATENT DOCUMENTS

| | | | | |
|---|---|---|---|---|
| 2022/0218764 | A1* | 7/2022 | Embree | A61K 35/741 |
| 2022/0237930 | A1* | 7/2022 | Rando | G06V 10/764 |
| 2022/0392613 | A1* | 12/2022 | Aifuwa | G06N 3/045 |
| 2023/0117821 | A1* | 4/2023 | Ivie | G06T 7/33<br>382/128 |
| 2025/0218201 | A1* | 7/2025 | Mavropoulos | G06V 10/82 |

* cited by examiner

AUTOMATED PHENOTYPIC ANALYSIS OF MICROSCOPIC IMAGES USING A CASCADE ML ARCHITECTURE WITH ITERATIVE ACTIVE LEARNING

BACKGROUND

Microscopic images play a pivotal role in both medical diagnosis and research. Microscopic images offer a window into the microscopic world of tissue, enabling professionals to discern the phenotypes indicative of the health or disease state of an organ. Historically, the analysis of microscopic images has been done manually. This manual process, while effective, is time-consuming and fraught with challenges, such as potential human error and variability among interpreters.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some implementations relate to a method. The method includes receiving an image, wherein the image is a microscopic image of an organism. The method includes determining, using a first machine learning model, whether the image is usable for processing. The method includes identifying, using a second machine learning model, whether majority phenotype attributes are in the image in response to the first machine learning model determining the image is usable for processing. The method includes identifying, using a third machine learning model, whether minority phenotype attributes are in the image in response to the first machine learning model determining the image is usable for processing. The method includes providing an image output with the image and any detected majority phenotype attributes and any minority phenotype attributes identified in the image.

Some implementations relate to a device. The device includes a processor; memory in electronic communication with the processor; and instructions stored in the memory, the instructions being executable by the processor to: receive an image, wherein the image is a microscopic image of an organism; determine, using a first machine learning model, whether the image is usable for processing; identify, using a second machine learning model, whether majority phenotype attributes are in the image in response to the first machine learning model determining the image is usable for processing; identify, using a third machine learning model, whether minority phenotype attributes are in the image in response to the first machine learning model determining the image is usable for processing; and provide an image output with the image and any detected majority phenotype attributes identified in the image and any minority phenotype attributes identified in the image.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
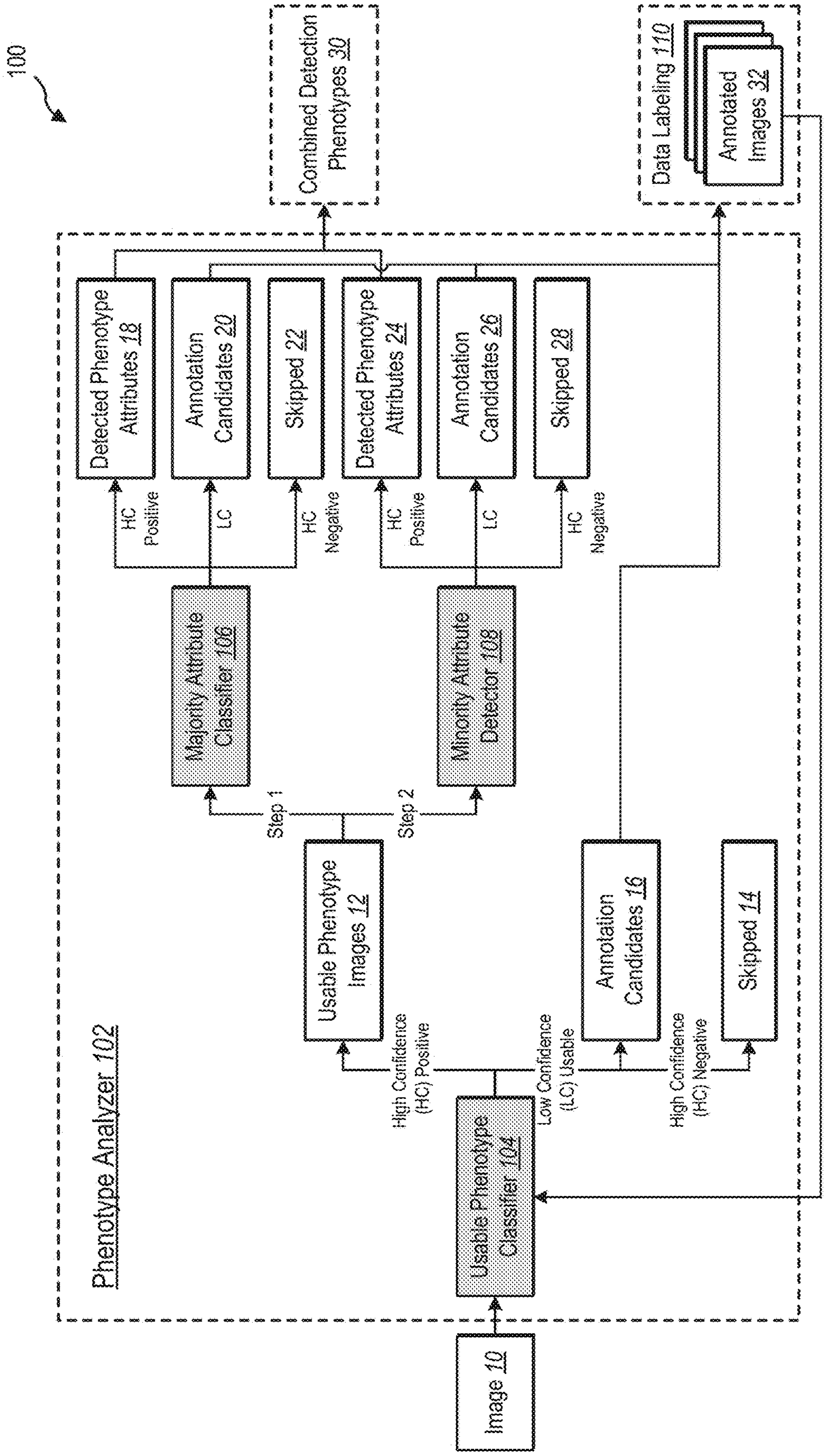
FIG. 1 illustrates an example environment for automated phenotypic analysis of microscopic images in accordance with implementations of the present disclosure.

This disclosure generally relates to automated phenotypic analysis of microscopic images. Microscopic images play a pivotal role in both medical diagnosis and research. Microscopic images offer a window into the microscopic world of tissue, enabling professionals to discern the phenotypes indicative of the health or disease state of an organ. One example microscopic image includes images of a liver. Historically, the analysis of microscopic images has been done manually by trained professionals. This manual process, while effective, is time-consuming and fraught with challenges, such as potential human error and variability among interpreters. As medical research and diagnostics move toward precision and efficiency, the need for automation in such analyses becomes increasingly apparent. Given the plethora of images and the microscopic nuances the images include, there is a need for an automated system capable of discerning and categorizing diverse liver phenotypes with precision. Automation promises consistency, rapidity, and the ability to scale the analytical process to vast datasets.

Existing automated systems typically employ generic machine learning algorithms to classify and detect anomalies in medical images. Existing systems might include convolutional neural networks (CNNs) or pre-trained models with some fine-tuning tailored to the specific medical imaging dataset. Most of the existing systems operate with a one-size-fits-all approach, treating all images with a uniform analysis protocol, regardless of their clarity or the rarity of features within the images.

The present disclosure provides systems and methods for automated phenotypic analysis of microscopic images using a cascade machine learning architecture with iterative active learning. The systems and methods divide the automated phenotypic analysis into multiple subcomponents. The systems and methods use different machine learning models for processing each of the subcomponents. The system and methods optimize the machine learning models for each of the subcomponents. The present disclosure includes a number of practical applications that provide benefits and/or solve problems associated with automated phenotypic analysis of microscopic images. Examples of these applications and benefits are discussed in further detail below.

The systems and methods include a phenotype analyzer that uses a cascade machine learning model architecture with a tiered processing approach to analyze the microscopic images and provide an image output with any detected majority phenotype attributes and/or any detected minority phenotype attributes by the machine learning models. The cascade machine learning model architecture includes a plurality of machine learning models that function hierarchically where an output of a machine learning model is the input to a next machine learning model in the hierarchy. Initially the images are sorted based on clarity and the cascade machine learning model architecture directs the images for phenotypic analysis in response to sorting the images based on clarity.

The systems and methods learn on multi-class classification models, harnessing the vastness of available data for commonly occurring liver features (majority attributes). The systems and methods use specialized object detection machine learning models (e.g., YOLO, SSD, and/or Faster R-CNN) for rarer features (minority attributes).

The systems and methods use an iterative active-learning process that increases an adaptability of the phenotype analyzer. In instances of prediction uncertainty, images are relayed to experts for annotation. The newly acquired knowledge (e.g., the annotated images) are fed back into the phenotype analyzer, refining a predictive acumen of the phenotype analyzer. The active-learning process provides a continual refinement mechanism that fosters adaptability, enhancing the phenotype analyzer's predictions with each iteration.

The cascade machine learning model architecture includes a cascading flow of data from raw images, through clarity sorting, through a bifurcated processing approach, to specific phenotypic detection, and finally, into the feedback loop for continuous improvement. The methods and systems differentiate and appropriately process images based on a clarity of the images and the abundance of the training samples.

One example use case of the systems and methods includes a user providing a microscopic image of a liver to the phenotype analyzer. The phenotype analyzer uses the cascade machine learning model architecture to automatically analyze the image and provide an image output. The image output includes the image and a plurality of majority phenotype attributes identified in the image and a minority phenotype attribute identified in the image. The user uses the image output in performing diagnosis of the liver. For example, the user uses the image output to determine whether a new drug is helping the liver to improve. Another example includes the user using the image output to determine whether the liver is damaged.

One technical advantage of the systems and methods of the present disclosure is precision and adaptability. The systems and methods of the present disclosure use a cascade machine learning model architecture that allows for a tiered, nuanced analysis. Instead of a single pass analysis, images undergo an initial sorting based on their clarity, ensuring only high-quality images are subjected to detailed phenotypic detection by the systems and methods. Using a tiered processing approach ensures optimal resource allocation and accurate image categorization. By decoupling multiple computation modules into a separate tier in the cascade machine learning model architecture, the systems and methods may ensure optimal resource allocation by using the most suitable compute resource for each module (e.g., a graphics processing unit (GPU) machine for components that require a GPU).

Another technical advantage of the systems and methods of the present disclosure is a bifurcated analysis for majority and minority attributes ensuring precision in the analysis. The systems and methods tailor the analysis based on the attribute's prevalence in the dataset. The systems and methods deploy multi-class classification models for the analysis of the majority attributes and deploy specialized object detection models for the minority attributes ensuring that each phenotype is processed using the most applicable machine learning model given a prevalence of the attribute in the dataset.

Another technical advantage of the systems and methods of the present disclosure is an iterative active-learning process that introduces a dynamic feedback loop. The systems and methods include a continual refinement mechanism that fosters adaptability, improving the system's predictions with each iteration. In instances of prediction ambivalence, real-time human expert annotations are used to continually refine the systems. In contrast to static models which, once trained, remain unaltered without adapting to new or nuanced data patterns.

Another technical advantage of the systems and method of the present disclosure is a balance of speed and scalability. The systems and methods use scalable datacentric machine learning approaches combined with graphics processing unit (GPU) acceleration and cloud based deployments that offers a balance of speed and scalability.

Referring now to FIG. 1, illustrated is an example environment 100 for automated phenotypic analysis of microscopic images. The environment 100 includes a phenotype analyzer 102 that automatically analyzes microscopic images and identifies phenotypes in the microscopic images. Microscopic images are visual representations of objects or details that are too small to be seen with the naked eye. Microscopic images are captured using microscopes, which magnify the subject to allow for detailed observation and analysis. Several types of microscopes and microscopy techniques may be used to produce microscopic images, each suitable for different applications and types of specimens. One example of a specimen includes tissue of an organism. One example microscopic image is an image of liver tissue. Phenotypes are observable traits or characteristics of an organism. One example of phenotypes includes specific features or abnormalities in liver tissue.

In some implementations, users access the phenotype analyzer 102 using a computing device. For example, the users access the phenotype analyzer 102 using an application on the computing device or browser on the computing device. In some implementations, the phenotype analyzer 102 is on a server (e.g., a cloud server) remote from the computing device of the user. In some implementations, the phenotype analyzer 102 is hosted on virtual machines in the cloud. In some implementations, the phenotype analyzer 102 is on an edge device. In some implementations, the phenotype analyzer 102 is local to the computing device of the user.

The phenotype analyzer 102 includes a plurality of machine learning models (the machine learning model 104, the machine learning model 106, and the machine learning model 108) in a cascade machine learning model architecture. A cascade machine learning model architecture is a hierarchical sequence of machine learning models where an output from one machine learning model feed as input into a next machine learning model in the hierarchical sequence.

The phenotype analyzer 102 receives an image 10 (e.g., a microscopic image). In some implementations, a user provides the image 10. In some implementations, the image 10 is obtained from a training dataset of microscopic images. A first machine learning model (the machine learning model 104) receives the image 10 and sorts the image 10 into groups: clear images, indeterminate images, and unclear images. In some implementations, the machine learning model 104 is a classifier machine learning model that classifies the image 10 into a clear image group, an indeterminate image group, or an unclear image group. A clear image is an image where a subject matter expert can visually derive the properties of the object in the image. Unclear images may produce noisy predictions by the phenotype analyzer 102 and may cause misleading information.

The machine learning model 104 places the image 10 in a clear image group (the usable phenotype images 12) in response to a high confidence that the image 10 is clear (high confidence positive). A high confidence is a prediction state where the machine learning model ascribes a probability value close to the upper extremity of the probability scale (typically approaching 1 for a normalized scale) to a particular outcome or classification. This indicates that the model is substantially certain about the veracity of its prediction based on the learned patterns from its training data. In practical terms, high confidence might be reflected in probability values above a certain threshold, e.g., 0.85 or 0.9 on a scale of 0 to 1. For example, probability values approaching 1 indicates that the machine learning model 104 has a high confidence the image 10 is clear.

The machine learning model 104 places the images 10 into an indeterminate image group (annotation candidates 16) in response to a low confidence that the image 10 is clear or unclear. An indeterminate image is an image that is uncertain in its depiction of phenotypes. A low confidence is a prediction state where the machine learning model ascribes a probability value that resides near the mid-point of the probability scale (around 0.5 for a normalized scale) or even lower, indicating uncertainty or ambivalence about the outcome. A probability value near the middle typically signifies that the machine learning model's prediction is more of a guess rather than a well-informed decision, or that the input data may not align well with the patterns the model has learned from its training dataset. Practically, low confidence might be reflected in probability values that are near or below a defined threshold, e.g., values between 0.4 and 0.6 on a scale of 0 to 1. For example, a probability value of 0.43 indicates that the machine learning model 104 has a low confidence that the image 10 is clear and places the image 10 in a queue of annotation candidates 16 for further processing.

The annotation candidates 16 are forwarded to data labeling 110. A user reviews the annotation candidates 16 and generates annotated images 32 with labels that identify the image as clear or unclear. In some implementations, the user is an expert, such as a pathologist. Pathologists are medical doctors who diagnose disease by examining tissues, cells, and bodily fluids. Some pathologists receive additional training to become experts in interpreting electron microscopy images, which can be particularly useful in diagnosing a range of diseases, including viral infections, kidney diseases, and certain types of cancer. The annotated images 32 from the user are provided to the phenotype analyzer 102 as input. The machine learning model 104 uses the annotations to place the annotated images 32 into groups. By providing the annotated images 32 to the machine learning model 104, the training dataset increases and the machine learning model 104 continues to learn and improve the predictions of whether the images 10 are usable (clear) or unusable (unclear or distorted).

The machine learning model 104 places the image 10 into an unclear image group (unusable phenotype images 14) in response to a high confidence that the image 10 is unclear (high confidence negative). For example, a 0.85 indicates that the machine learning model 104 has a high confidence that the image 10 is unclear or distorted (e.g., unusable) and skips further processing of the image 10.

The usable phenotype images 12 are processed further by the phenotype analyzer 102. The output of the machine learning model 104 (the usable phenotype images 12) is provided as input to the next machine learning models in the cascade machine learning model architecture. The usable phenotype images 12 are provided to two different machine learning models (the machine learning model 106 and the machine learning model 108) to look for separate attributes in the usable phenotype images 12. Processing the usable phenotype images 12 using two different machine learning models ensures that each phenotype in the usable phenotype images 12 is processed using a most applicable machine learning model. The usable phenotype images 12 are processed based on a prevalence of the phenotype in the dataset (e.g., a frequency of occurrence of the phenotype in the dataset).

The images 10 included in the usable phenotype images 12 are provided to the machine learning model 106. In some implementations, the machine learning model 106 is a classifier looking for majority attributes in the images 10. Majority attributes are phenotype attributes with sufficient training samples. For example, majority attributes are common liver features. Examples of majority attributes include cell body shape, cell body size, and nucleus size.

The machine learning model 106 compares the image 10 to a large database of images to classify the features the machine learning model 106 identifies in the images 10. The machine learning model 106 is trained based on a large database of images that correspond to the known majority phenotype attributes. In some implementations, the machine learning model 106 is a multi-label predictive model that is able to tell when there is a high probability that one of many of the majority phenotype attributes are present in the image. The machine learning model 106 places the images 10 in a detected phenotype attributes group 18 in response to a high confidence that the image 10 includes a majority phenotype attribute or a plurality of majority phenotype attributes (high confidence positive). For example, a probability value of 0.93 indicates that the machine learning model 106 has a high confidence the image 10 includes a majority phenotype attribute.

The machine learning model 106 places the image 10 into a group without majority phenotype attributes (skipped images 22) in response to a high confidence that majority phenotype attributes are missing from the image 10 (high confidence negative). For example, a 0.95 indicates that the machine learning model 106 has a high confidence that the image 10 does not include majority phenotype attributes and skips further processing of the image 10.

The machine learning model 106 places the images 10 into an indeterminate image group (annotation candidates 20) in response to a low confidence that the image 10 includes a majority phenotype attribute. For example, a probability value of 0.55 indicates that the machine learning model 106 has a low confidence that the image 10 includes a majority phenotype attribute.

The annotation candidates 20 are forwarded to the data labeling 110. A user reviews the annotation candidates 20 and provide annotations to the images 10 as having one or more majority phenotype attributes or not including a majority phenotype attribute. In some implementations, the annotations for the majority phenotype attributes occur at an image level (e.g., for the whole image). An example annotation includes identifying whether the prediction is correct or incorrect. Another example annotation includes identifying a name of the majority phenotype attribute identified in the image 10. Another example annotation includes identifying that the majority phenotype attribute is not included in the image 10. The annotated images 32 are provided to the phenotype analyzer 102 as input. The machine learning model 106 places the annotated images 32 into groups. By providing the annotated images 32 to the phenotype analyzer 102, the training dataset increases. The machine learning model 106 is refined based on the annotations from the users and continues to learn and improve the predictions of whether the images 10 include majority phenotype attributes or whether majority phenotype attributes are missing from the images 10.

The images 10 included in the usable phenotype images 12 are also provided to the machine learning model 108. In some implementations, the machine learning model 108 is a trained object detection model looking for minority attributes in the images 10. Minority attributes are phenotype attributes with limited training samples. Examples of minority attributes include abnormally large mitochondria and cell body projections. Another example of a minority attribute includes a rare liver feature. The machine learning model 108 is trained based on the location of the attribute in the image and the texture of the areas that have the attribute. A set of the minority attributes are normally unique and have less training samples than the majority attribute. Examples of the machine learning model 108 include YOLO, SSD, and Faster R-CNN. The machine learning model 108 is trained to spot and pinpoint rare features in the image 10 even with the training data sample set is limited.

The machine learning model 108 automatically performs object detection in the image 10 to determine whether any minority attributes are in the image 10. The machine learning model 106 places the images 10 in a detected phenotype attributes group 24 in response to a high confidence that the image 10 includes a minority phenotype attribute or a plurality of minority phenotype attributes (high confidence positive). For example, a probability value of 0.97 indicates that the machine learning model 108 has a high confidence the image 10 includes a minority phenotype attribute. Another example includes a probability value of 0.84 indicates that the machine learning model 108 has a high confidence the image 10 includes a plurality of minority phenotype attributes.

The machine learning model 108 places the image 10 into a group without minority phenotype attributes (skipped images 28) in response to a high confidence that minority phenotype attributes are missing from the image 10 (high confidence negative). For example, a 0.94 indicates that the machine learning model 104 has a high confidence that the image 10 does not include minority phenotype attributes and skips further processing of the image 10.

The machine learning model 108 places the images 10 into an indeterminate image group (annotation candidates 26) in response to a low confidence that the image 10 includes a minority phenotype attribute. For example, a probability value of 0.43 indicates that the machine learning model 108 has a low confidence that the image 10 includes a minority phenotype attribute.

The annotation candidates 26 are forwarded to data labeling 110. A user reviews the annotation candidates 26 and annotates the images 10 as having one or more minority phenotype attributes or not including any minority phenotype attributes. The annotated images 32 with annotations from the user are provided to the phenotype analyzer 102 as input. An example annotation includes identifying whether the prediction is correct or incorrect. Another example annotation includes identifying a location with a minority phenotype attribute. Another example annotation includes identifying a name of the minority phenotype attribute. The machine learning model 108 uses the annotations to place the annotated images 32 into groups. By providing the annotated images 32 with annotations to the phenotype analyzer 102, the training dataset increases and the machine learning model 108 continues to learn using the provided annotations and improves the predictions of whether the images 10 include minority phenotype attributes or whether minority phenotype attributes are missing from the images 10.

The phenotype analyzer 102 combines the phenotypes detected in the image 10 (the majority attributes and/or the minority attributes) and provides an image output 30 of the image 10 with the combined detected phenotypes. Each phenotype attribute whether the phenotype attribute belongs to the majority or the minority is not mutually exclusion and can coexist or exist independently. In some implementations, a plurality of majority phenotype attributes are detected in the image 10 and included in the image output 30. In some implementations, a plurality of minority phenotype attributes are detected in the image 10 and included in the image output 30. In some implementations, a majority phenotype attribute and a minority phenotype attribute are detected in the image 10 and included in the image output 30. In some implementations, a plurality of majority phenotype attributes and a plurality of minority phenotype attributes are detected in the image 10 and included in the image output 30.

In some implementations, the image output 30 is an image with the detected phenotypes highlighted or otherwise visually distinct from other portions of the image. For example, a first color is used to identify a location in the image 10 of the majority phenotype attributes and labels are provided with the name of the majority attributes and a second color is used to identify a location in the image 10 of the minority phenotype attributes and labels are provided with the name of the minority phenotype attributes. Another example includes a first design is used to identify a location in the image 10 of the majority phenotype attribute and a second design is used to identify a location in the image 10 of the minority phenotype attribute. In some implementations, a score is provided in the image output 30 with the detected phenotypes. The score is an indication of how confident the phenotype analyzer 102 is of the prediction of the detected phenotypes.

The structure of the cascade machine learning model architecture is dynamic. Any number of machine learning models may be included in the cascade machine learning model architecture. In some implementations, the number of machine learning models is selected in response to a distribution of the training data. For example, additional machine learning models are added to the cascade machine learning model architecture (e.g., to classify data) in response to a large distribution of training data. Another example includes reducing a number of the machine learning models in the cascade machine learning architecture in response to a lower distribution of training data. The machine learning models included in the cascade machine learning model architecture continue to learn and improve in predictions over time by using iterative active learning by adding annotated images with annotations from a user back into the cascade machine learning model architecture to refine the machine learning models. By using a dynamic structure of the cascade machine learning model architecture, the structure of the cascade machine learning model architecture is scalable. In some implementations, the phenotype analyzer 102 uses GPU acceleration or cloud computing to increase a speed and scalability of the phenotype analyzer 102.

The phenotype analyzer 102 is trained using machine learning model training tools. The machine learning model training tools may optimize each machine learning model (the machine learning model 104, the machine learning model 106, the machine learning model 108) in the cascade machine learning model architecture. In a cascade architecture, the output of the previous component (e.g., a machine learning model in a previous tier) is the input of the next components (e.g., machine learning models in a next tier). Before passing on the output, each component also has the prediction confidence which is used to filter out cases that are uncertain and should not be consumed by the next component. Due to this cascade nature, the final outcome of a cascade framework is highly accurate.

Limited training data is available for the minority phenotype attributes and the machine learning model training tools use the training dataset to optimize the machine learning model 108 (the minority attribute object detector) to have high accuracy in detecting minority phenotype attributes. The training data is used to train the machine learning model 108 to identify subtle visual cues in the images to indicate a minority phenotype attribute in the images and identify specific locations in the images where the visual cues occur. For example, a training dataset includes 40 images with the minority phenotype attribute.

Large training datasets exist for frequently occurring phenotypes (the majority phenotype attributes). The training data is used on a plurality of classifiers and different experimentations are performed using the plurality of classifiers with different parameter settings. The evaluation metrics are used to select a classifier that can accurately detect phenotypes as the machine learning model 106 (e.g., the majority attribute classifier with the best evaluation metrics). For example, a hundred experiments are run using the training data on the plurality of classifiers (e.g., RESNET 18 model, a RESNET 50 model) and evaluation metrics are used to select the classifier that produces the most accurate prediction as the machine learning model 106.

In some implementations, one or more computing devices (e.g., servers and/or devices) are used to perform the processing of the environments 100. The one or more computing devices may include, but are not limited to, server devices, cloud virtual machines, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the phenotype analyzer 102 is implemented wholly on a computing device. Another example includes one or more subcomponents of the phenotype analyzer 102 (e.g., the machine learning models 104, 106, 108 and/or the data labelling 110) implemented across multiple computing devices. Moreover, in some implementations, one or more subcomponent of the phenotype analyzer 102 (e.g., the machine learning models 104, 106, 108 and/or the data labelling 110) may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environments 100 and 200 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
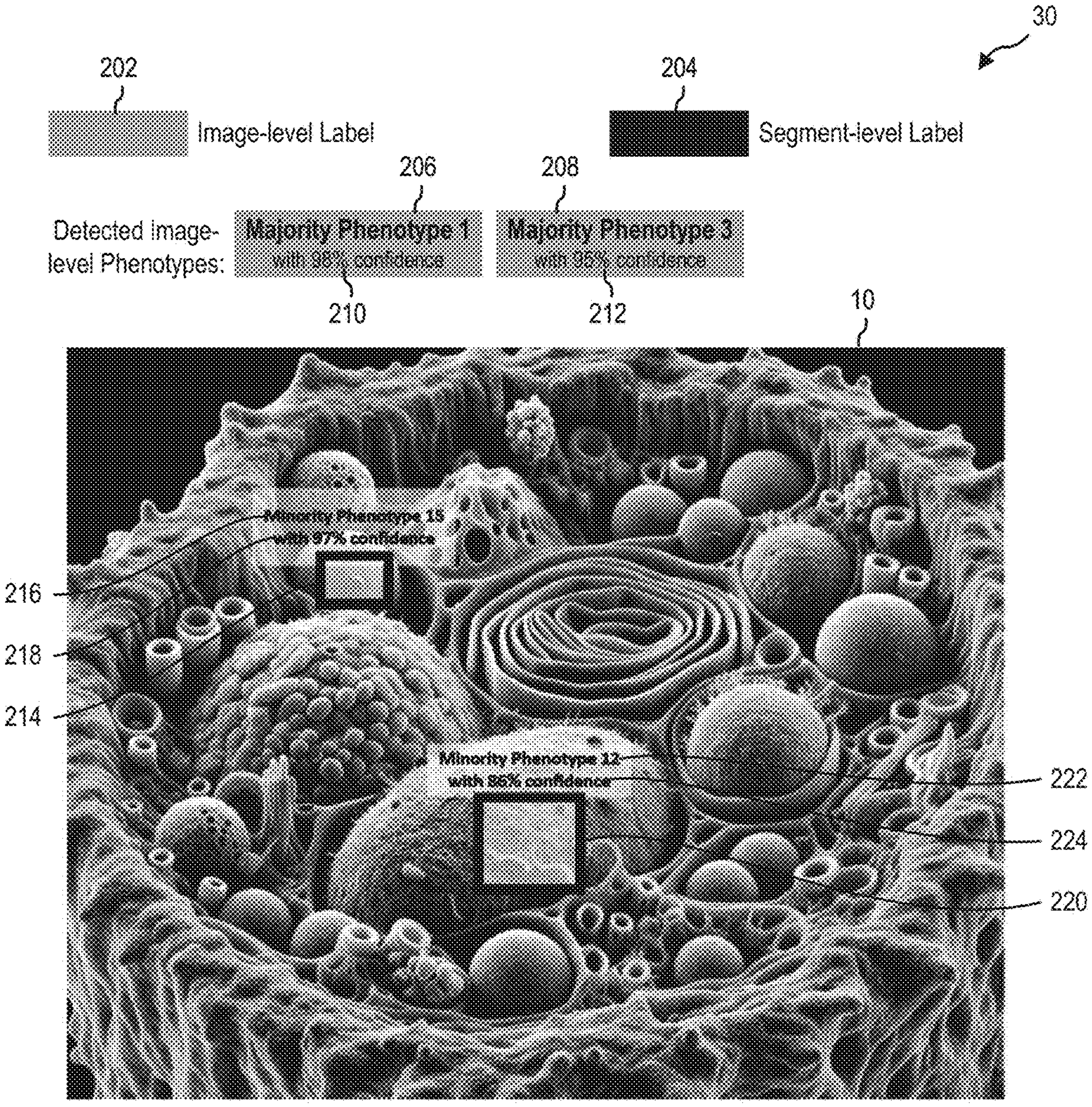
FIG. 2 illustrates an example image output in accordance with implementations of the present disclosure.

FIG. 2 illustrates an example image output 30 provided by the phenotype analyzer 102 (FIG. 1) in response to providing the image 10 to the phenotype analyzer 102 for processing. For example, the phenotype analyzer 102 provides the image output 30 after sending the image 10 through the cascade machine learning model architecture where a plurality of machine learning models (the machine learning model 104, the machine learning model 106, and the machine learning model 108 (FIG. 1)) process the image 10 in a hierarchical order where an output of one machine learning model is the input to a next machine learning model in the hierarchy.

The image output 30 includes image-level labels 202 and segment-level labels 204. The image-level label 202 identifies phenotype attributes that the machine learning models identified as appearing in the image 10. The image-level label 202 is for the whole image 10, not for a specific location within the image 10. The image-level label 202 indicates that a majority phenotype attribute 206 (the majority phenotype 1) occurs in the image with a score 210 of 98% (e.g., the machine learning model 106 has a confidence level of 98% that the majority phenotype 1 appears in the image 10). The image-level label 202 also indicates that a majority phenotype attribute 208 (the majority phenotype 3) appears in the image 10 with a score 212 of 95% (e.g., the machine learning model 106 has a confidence level of 95% that the majority phenotype 3 appears in the image 10).

The segment-level label 204 identifies locations in the image where the machine learning models identified phenotype attributes in the image 10. The segment-level label 204 identifies a location 214 in the image 10 where a minority phenotype attribute 216 (minority phenotype attribute 15) is located with a score 218 of 97% (e.g., the machine learning model 108 has a confidence level of 97% that the minority phenotype attribute 15 is located in the image at the location 214). The segment-level label 204 also identifies a location 220 in the image 10 where a minority phenotype attribute 222 (minority phenotype attribute 12) is located with a score 224 of 86% (e.g., the machine learning model 108 has a confidence level of 86% that the minority phenotype attribute 12 is located in the image at the location 220).

The image output 30 highlights the different prediction results from the phenotype analyzer 102 making the different prediction results visually distinct in the image 10. While two majority phenotype attributes (the majority phenotype attribute 206 and the majority phenotype attribute 208) are illustrated as predicted by the phenotype analyzer 102, any number of majority phenotype attributes may be identified by the phenotype analyzer 102 in the image 10. In addition, while two minority phenotype attributes (the minority phenotype attribute 216, the minority phenotype attribute 222) are illustrated as predicted by the phenotype analyzer 102, any number of minority phenotype attributes may be identified by the phenotype analyzer 102 in the image 10.

The users may use the image output 30 in performing medical diagnosis and research. The users may use the image output 30 and the phenotypes identified to aid in medical diagnosis and/or research. For example, the users may use the image-level labels 202 and/or the segment-level labels 204 to discern the health or disease state of an organ.

Figure 3:
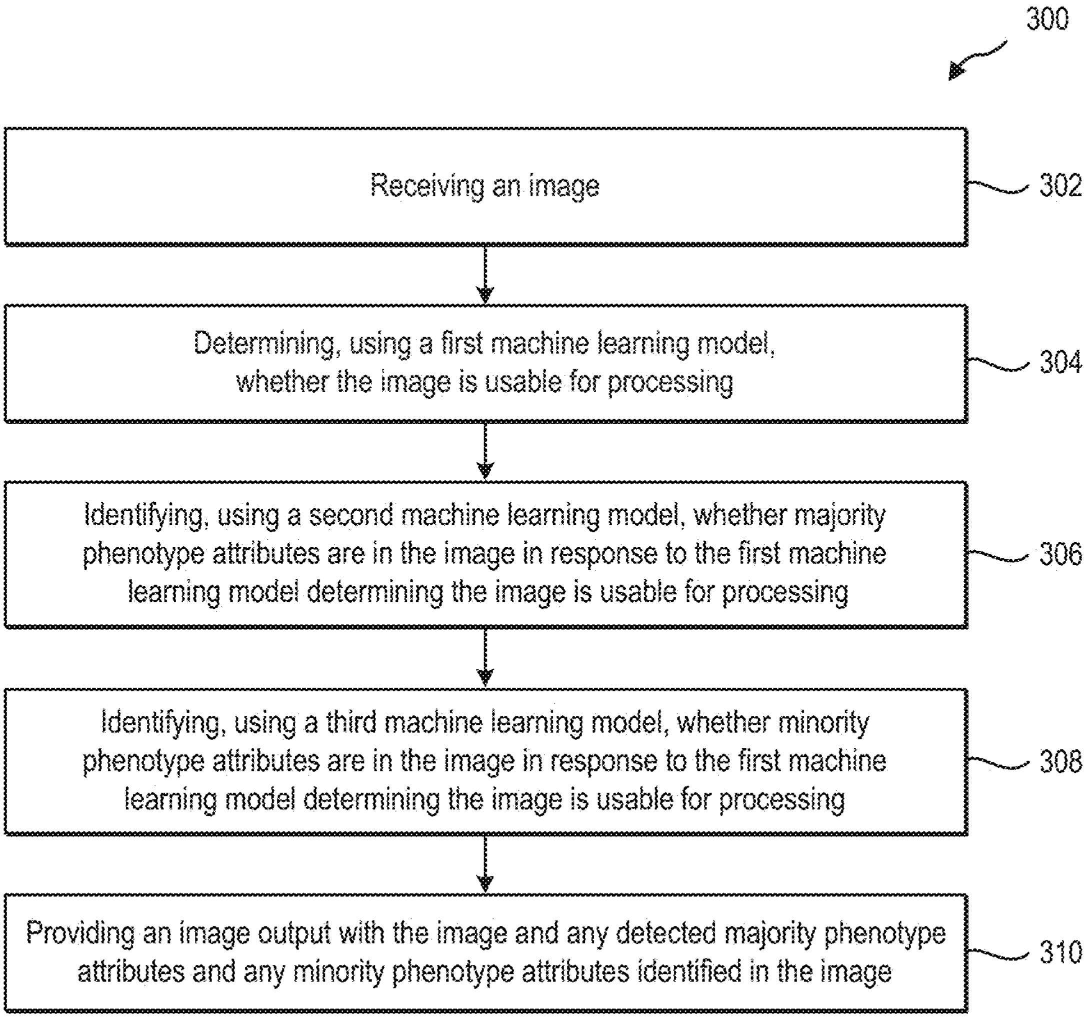
FIG. 3 illustrates an example method for automated phenotypic analysis of microscopic images in accordance with implementations of the present disclosure.

FIG. 3 illustrates an example method 300 for automated phenotypic analysis of microscopic images. The actions of the method 300 are discussed below in reference to FIGS. 1 and 2.

At 302, the method 300 includes receiving an image. The image 10 is a microscopic image of an organism. For example, the image 10 is a microscopic image of tissue from an organ. The phenotype analyzer 102 receives the image 10. The phenotype analyzer 102 uses a cascade machine learning model architecture with a tiered processing approach to analyze the microscopic images 10. The cascade machine learning model architecture includes a plurality of machine learning models (the machine learning model 104, the machine learning model 106, the machine learning model 108) that function hierarchically where an output of a machine learning model is the input to a next machine learning model in the hierarchy. For example, an output (e.g., the usable phenotype images 12) of the first machine learning model (e.g., the machine learning model 104) is provided as input to the second machine learning model (e.g., the machine learning model 106) and the output (e.g., the usable phenotype images 12) of the first machine learning model (e.g., the machine learning model 104) is provided as input to the third machine learning model (e.g., the machine learning model 108).

At 304, the method 300 includes determining, using a first machine learning model, whether the image is usable for processing. In some implementations, the first machine learning model (e.g., the machine learning model 104) identifies the image 10 as usable in response to the first machine learning model having a high confidence that the image 10 is clear and usable for further processing. In some implementations, the first machine learning model (e.g., the machine learning model 104) identifies the image 10 is unusable in response to the first machine learning model having a high confidence that the image 10 is unclear and unusable for further processing. The unusable images are skipped for further processing. In some implementations, the first machine learning model (e.g., the machine learning model 104) is a classifier machine learning model trained using a large set of training data to identify whether images are clear or distorted.

In some implementations, the first machine learning model (e.g., the machine learning model 104) sends the image 10 for annotation by a user in response to the first machine learning model having a low confidence that the image 10 is usable. The phenotype analyzer 102 receives, from the user, annotated images 32 with annotations from the user. For example, the annotations include whether the image is clear or unclear. The annotated images 32 are provided to the first machine learning model (e.g., the machine learning model 104) and the first machine learning model uses the annotations in the annotated images 32 to determine whether the annotated images 32 are usable for processing (e.g., clear or unclear). By providing the annotated images 32 with annotations to the machine learning model 104, the training dataset increases and the machine learning model 104 continues to learn and improve the predictions of whether the images 10 are usable (clear) or unusable (unclear or distorted).

At 306, the method 300 includes identifying, using a second machine learning model, whether majority phenotype attributes are in the image in response to the first machine learning model determining the image is usable for processing. The majority phenotype attributes are phenotypes that have a high frequency of occurrence in a dataset of images. In some implementations, the second machine learning model (e.g., the machine learning model 106) identifies one or more majority phenotype attributes in the image 10 in response to the second machine learning model having a high confidence that one or more majority phenotype attributes are in the image 10.

In some implementations, the second machine learning model (e.g., the machine learning model 106) identifies that the image 10 is missing a majority phenotype attribute in response to the second machine learning model having a high confidence that the image 10 is missing majority phenotype attributes. Images 10 missing the majority phenotype attributes are skipped for further processing by the second machine learning model. In some implementations, the second machine learning model (e.g., the machine learning model 106) is a classifier machine learning model trained using a large dataset of images to accurately detect majority phenotype attributes.

In some implementations, the second machine learning model (e.g., the machine learning model 106) sends the image 10 for annotation by a user in response to the second machine learning model having a low confidence that the image 10 contains a majority phenotype attribute. The phenotype analyzer 102 receives, from the user, annotated images 32 with annotations from the user. For example, the annotations include a name of the majority phenotype attribute identified and a location in the image for the majority phenotype attribute. The annotated images 32 are provided to the second machine learning model (e.g., the machine learning model 106) and the second machine learning model uses the annotations in the annotated images 32 to determine whether the annotated images 32 contains majority phenotype attributes. By providing the annotated images 32 to the phenotype analyzer 102, the training dataset increases. The machine learning model 106 is refined based on the annotations from the users and continues to learn and improve the predictions of whether the images 10 include majority phenotype attributes or whether majority phenotype attributes are missing from the images 10.

At 308, the method 300 includes identifying, using a third machine learning model, whether minority phenotype attributes are in the image in response to the first machine learning model determining the image is usable for processing. The minority phenotype attributes are phenotypes that have a low frequency of occurrence in a dataset of images. In some implementations, the third machine learning model (e.g., the machine learning model 108) identifies one or more minority phenotype attributes in the image 10 in response to the third machine learning model having a high confidence that one or more minority phenotype attributes are in the image 10.

In some implementations, the third machine learning model (e.g., the machine learning model 108) identifies that the image 10 is missing minority phenotype attributes in response to the third machine learning model having a high confidence that the image 10 is missing minority phenotype attributes. Images missing minority phenotype attributes are skipped for further processing by the third machine learning model (e.g., the machine learning model 108). In some implementations, the third machine learning model is an object detection machine learning model trained using a small dataset of images to accurately detect minority phenotype attributes in images.

In some implementations, the third machine learning model (e.g., the machine learning model 108) sends the image 10 for annotation by a user in response to the third machine learning model having a low confidence that the image 10 contains a minority phenotype attribute. The phenotype analyzer 102 receives, from the user, annotated images 32 with annotations from the user. For example, the annotations indicate that the image does not include a minority phenotype attribute. The annotated images 32 are provided to the third machine learning model (e.g., the machine learning model 108) and the third machine learning model uses the annotations in the annotated images 32 to determine whether the annotated images 32 contains minority phenotype attributes. By providing the annotated images 32 with annotations to the phenotype analyzer 102, the training dataset increases and the machine learning model 108 continues to learn using the provided annotations and improves the predictions of whether the images 10 include minority phenotype attributes or whether minority phenotype attributes are missing from the images 10.

At 310, the method 300 includes providing an image output with the image and any detected majority phenotype attributes and any minority phenotype attributes identified in the image. The phenotype analyzer 102 outputs the image output 30 with the image 10 and any detected majority phenotype attributes and any minority phenotype attributes identified in the image 10.

In some implementations, the image output 30 includes a location where a majority phenotype attribute is in the image 10 and a score indicating a confidence level of the second machine learning model (e.g., the machine learning model 106) that the majority phenotype attribute is at the location in the image. In some implementations, the image output 30 includes a location (e.g., the locations 214, 220) where a minority phenotype attribute (e.g., the minority phenotype attribute 216, 222) is in the image 10 and a score (e.g., the scores 218, 224) indicating a confidence level of the third machine learning model that the minority phenotype attribute is at the location in the image 10.

In some implementations, the image output 30 includes an image-level label 202 indicating the majority phenotype attributes (e.g., the majority phenotype attributes 206, 208) identified by the second machine learning model (e.g., the machine learning model 106) in the image 10 and a score (e.g., the scores 210, 212) indicating a confidence level of the second machine learning model that the majority phenotype attributes are in the image 10. The image output 30 also includes a segment-level label 204 indicating a location (e.g., the locations 214, 220) in the image 10 of a minority phenotype attribute (e.g., a minority phenotype attributes 216, 222) and a score (e.g., scores 218, 224) indicating a confidence level of the third machine learning model (e.g., the machine learning model 108) that the minority phenotype attribute is at the location in the image 10.

The method 300 uses a plurality of machine learning models in the phenotype analyzer 102 to automatically perform a tiered processing approach to analyze the microscopic images and provide an image output with any detected majority phenotype attributes. The method 300 includes an active-learning process that provides a continual refinement mechanism using the annotated images from the user to enhance the phenotype analyzer's 102 predictions with each iteration.

Figure 4:
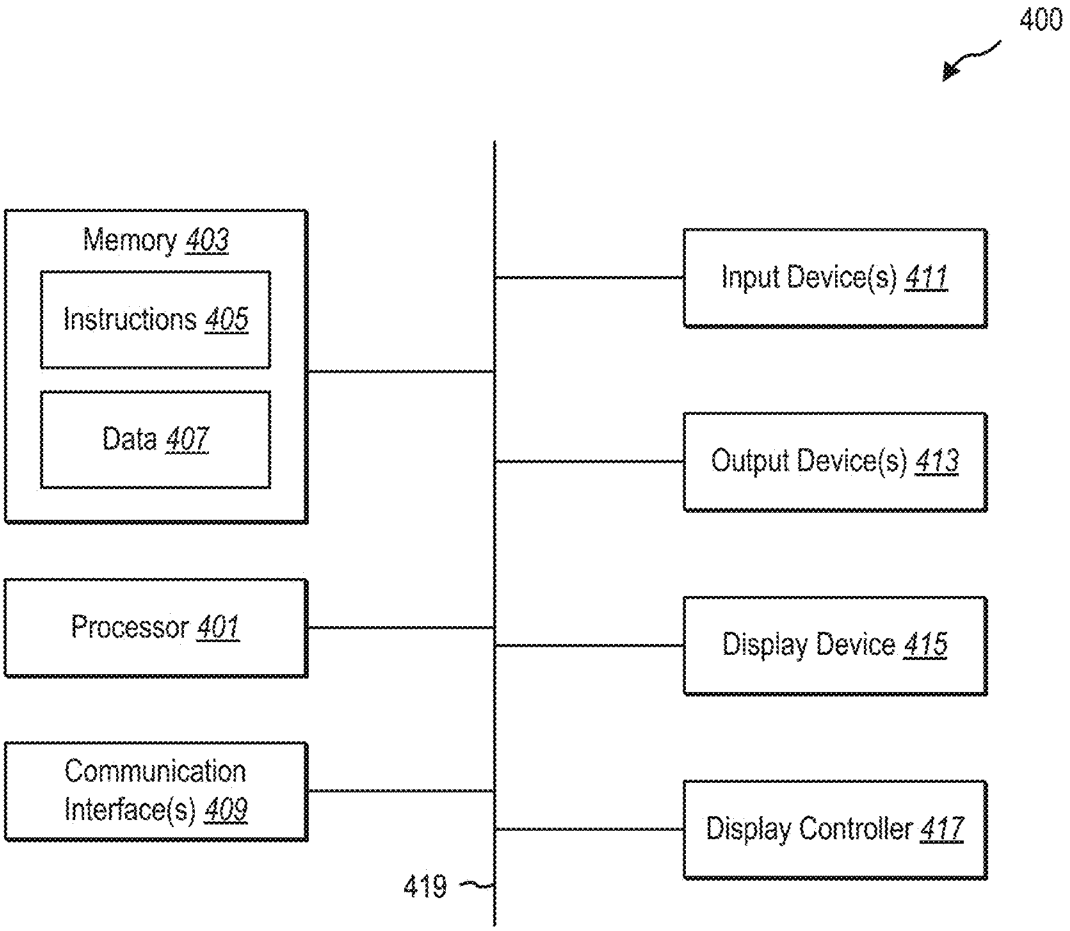
FIG. 4 illustrates components that may be included within a computer system.

FIG. 4 illustrates components that may be included within a computer system 400. One or more computer systems 400 may be used to implement the various methods, devices, components, and/or systems described herein.

The computer system 400 includes a processor 401. The processor 401 may be a general-purpose single or multi-chip microprocessor (e.g., an Advanced RISC (Reduced Instruction Set Computer) Machine (ARM)), a special purpose microprocessor (e.g., a digital signal processor (DSP)), a graphics processing unit (GPU), a microcontroller, a programmable gate array, etc. The processor 401 may be referred to as a central processing unit (CPU). Although just a single processor 401 is shown in the computer system 400 of FIG. 4, in an alternative configuration, a combination of processors (e.g., an ARM and DSP) could be used.

The computer system 400 also includes memory 403 in electronic communication with the processor 401. The memory 403 may be any electronic component capable of storing electronic information. For example, the memory 403 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 405 and data 407 may be stored in the memory 403. The instructions 405 may be executable by the processor 401 to implement some or all of the functionality disclosed herein. Executing the instructions 405 may involve the use of the data 407 that is stored in the memory 403. Any of the various examples of modules and components described herein may be implemented, partially or wholly, as instructions 405 stored in memory 403 and executed by the processor 401. Any of the various examples of data described herein may be among the data 407 that is stored in memory 403 and used during execution of the instructions 405 by the processor 401.

A computer system 400 may also include one or more communication interfaces 409 for communicating with other electronic devices. The communication interface(s) 409 may be based on wired communication technology, wireless communication technology, or both. Some examples of communication interfaces 409 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 400 may also include one or more input devices 411 and one or more output devices 413. Some examples of input devices 411 include a keyboard, mouse, microphone, remote control device, button, joystick, trackball, touchpad, and lightpen. Some examples of output devices 413 include a speaker and a printer. One specific type of output device that is typically included in a computer system 400 is a display device 415. Display devices 415 used with embodiments disclosed herein may utilize any suitable image projection technology, such as liquid crystal display (LCD), light-emitting diode (LED), gas plasma, electroluminescence, or the like. A display controller 417 may also be provided, for converting data 407 stored in the memory 403 into text, graphics, and/or moving images (as appropriate) shown on the display device 415.

The various components of the computer system 400 may be coupled together by one or more buses, which may include a power bus, a control signal bus, a status signal bus, a data bus, etc. For the sake of clarity, the various buses are illustrated in FIG. 4 as a bus system 419.

In some implementations, the various components of the computer system 400 are implemented as one device. For example, the various components of the computer system 400 are implemented in a mobile phone or tablet. Another example includes the various components of the computer system 400 implemented in a personal computer. Another example includes the various components of the computer system 400 implemented in the cloud. Another example includes the various components of the computer system 400 implemented on an edge device.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model, a probabilistic graphical model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A method comprising:

receiving an image, wherein the image is a microscopic image of an organism;

determining, using a first machine learning model, whether the image is usable for processing;

identifying one or more majority phenotype attributes in the image in response to a second machine learning model having a confidence that one or more majority phenotype attributes are in the image and the first machine learning model determining the image is usable for processing;

identifying that the image is missing a majority phenotype attribute in response to the second machine learning model having a high confidence that the image is missing majority phenotype attributes and the first machine learning model determining the image is usable for processing, wherein images missing the majority phenotype attributes are skipped for further processing by the second machine learning model;

sending the image for annotation by a user in response to the second machine learning model having a low confidence that the image contains a majority phenotype attribute and provide an annotated image with annotations by the user to a third machine learning model to determine whether the annotated image contains minority phenotype attributes;

identifying, using the third machine learning model, whether minority phenotype attributes are in the image in response to the first machine learning model determining the image is usable for processing; and providing an image output with the image and any detected majority phenotype attributes and any minority phenotype attributes identified in the image.

2. The method of claim 1, wherein an output of the first machine learning model is provided as input to the second machine learning model and the output of the first machine learning model is provided as input to the third machine learning model.

3. The method of claim 1, further comprising:

identifying the image as usable in response to the first machine learning model having a high confidence that the image is clear and usable for further processing;

identifying the image is unusable in response to the first machine learning model having a high confidence that the image is unclear and unusable for further processing, wherein unusable images are skipped for further processing; and sending the image for annotation by a user in response to the first machine learning model having a low confidence that the image is usable.

4. The method of claim 3, further comprising:

receiving, from the user, annotated images with annotations from the user;

providing the annotated images to the first machine learning model; and determining, by the first machine learning model, using the annotations in the annotated images whether the annotated images are usable for processing.

5. The method of claim 1, further comprising:

receiving, from the user, annotated images with annotations from the user;

providing the annotated images to the second machine learning model; and determining, by the second machine learning model, using the annotations in the annotated images whether the image contains majority phenotype attributes.

6. The method of claim 1, further comprising:

identifying one or more minority phenotype attributes in the image in response to the third machine learning model having a confidence that one or more minority phenotype attributes are in the image;

identifying that the image is missing minority phenotype attributes in response to the third machine learning model having a high confidence that the image is missing minority phenotype attributes, wherein images missing minority phenotype attributes are skipped for further processing by the third machine learning model; and sending the image for annotation by a user in response to the third machine learning model having a low confidence that the image contains a minority phenotype attribute.

7. The method of claim 6, further comprising:

receiving, from the user, annotated images with annotations from the user;

providing the annotated images to the third machine learning model; and determining, by the third machine learning model, using the annotations in the annotated images whether the image contains minority phenotype attributes.

8. The method of claim 1, wherein the majority phenotype attributes are phenotypes that have a high frequency of occurrence in a dataset of images and the minority phenotype attributes are phenotypes that have a low frequency of occurrence in the dataset of images.

9. The method of claim 1, wherein the image output includes a location where a majority phenotype attribute is in the image and a score indicating a confidence level of the second machine learning model that the majority phenotype attribute is at the location in the image.

10. The method of claim 1, wherein the image output includes a location where a minority phenotype attribute is in the image and a score indicating a confidence level of the third machine learning model that the minority phenotype attribute is at the location in the image.

11. The method of claim 1, wherein the image output includes an image-level label indicating the majority phenotype attributes identified by the second machine learning model in the image and a score indicating a confidence level of the second machine learning model that the majority phenotype attributes are in the image and a segment-level label indicating a location in the image of a minority phenotype attribute and a score indicating a confidence level of the third machine learning model that the minority phenotype attribute is at the location in the image.

12. A system, comprising:

a memory to store data and instructions; and a processor operable to communicate with the memory, wherein the processor is operable to:

receive an image, wherein the image is a microscopic image of an organism;

determine, using a first machine learning model, whether the image is usable for processing;

identify, using a second machine learning model, whether majority phenotype attributes are in the image in response to the first machine learning model determining the image is usable for processing;

identify one or more minority phenotype attributes in the image in response to a third machine learning model having a confidence that one or more minority phenotype attributes are in the image and the first machine learning model determining the image is usable for processing;

identify that the image is missing minority phenotype attributes in response to the third machine learning model having a high confidence that the image is missing minority phenotype attributes and the first machine learning model determining the image is usable for processing, wherein images missing minority phenotype attributes are skipped for further processing by the third machine learning model;

send the image for annotation by a user in response to the third machine learning model having a low confidence that the image contains a minority phenotype attribute; and provide an image output with the image and any detected majority phenotype attributes identified in the image and any minority phenotype attributes identified in the image.

13. The system of claim 12, wherein an output of the first machine learning model is provided as input to the second machine learning model and the output of the first machine learning model is provided as input to the third machine learning model.

14. The system of claim 12, wherein the processor is further operable to:

identify the image as usable in response to the first machine learning model having a high confidence that the image is clear and usable for further processing;

identify the image is unusable in response to the first machine learning model having a high confidence that the image is unclear and unusable for further processing, wherein unusable images are skipped for further processing; and send the image for annotation by a user in response to the first machine learning model having a low confidence that the image is usable and providing an annotated image with annotations by the user to the first machine learning model to determine whether the annotated image is usable for processing.

15. The system of claim 12, wherein the processor is further operable to:

identify one or more majority phenotype attributes in the image in response to the second machine learning model having a confidence that one or more majority phenotype attributes are in the image;

identify that the image is missing a majority phenotype attribute in response to the second machine learning model having a high confidence that the image is missing majority phenotype attributes, wherein images missing the majority phenotype attributes are skipped for further processing by the second machine learning model; and send the image for annotation by a user in response to the second machine learning model having a low confidence that the image contains a majority phenotype attribute and provide an annotated image with annotations by the user to the second machine learning model to determine whether the annotated image contains majority phenotype attributes.

16. The system of claim 12, wherein the image output includes an image-level label indicating the majority phenotype attributes identified by the second machine learning model in the image and a score indicating a confidence level of the second machine learning model that the majority phenotype attributes are in the image and a segment-level label indicating a location in the image of a minority phenotype attribute and a score indicating a confidence level of the third machine learning model that the minority phenotype attribute is at the location in the image.

17. The system of claim 12, wherein the first machine learning model is a classifier machine learning model, the second machine learning model is a classifier machine learning model, and the third machine learning model is an object detection machine learning model.

18. The system of claim 12, wherein the second machine learning model is trained using a large dataset of images to accurately detect majority phenotype attributes and the third machine learning model is trained using a small dataset of images to accurately detect minority phenotype attributes.

19. A computer-readable storage medium including instructions that, when executed by a processor, cause the processor to:

receive an image, wherein the image is a microscopic image of an organism;

identify the image as usable in response to a first machine learning model having a high confidence that the image is clear and usable for further processing;

identify the image is unusable in response to the first machine learning model having a high confidence that the image is unclear and unusable for further processing, wherein unusable images are skipped for further processing;

send the image for annotation by a user in response to the first machine learning model having a low confidence that the image is usable and providing an annotated image with annotations by the user to the first machine learning model to determine whether the annotated image is usable for processing;

identify, using a second machine learning model, whether majority phenotype attributes are in the image in response to the first machine learning model determining the image is usable for processing;

identify, using a third machine learning model, whether minority phenotype attributes are in the image in response to the first machine learning model determining the image is usable for processing; and provide an image output with the image and any detected majority phenotype attributes identified in the image and any minority phenotype attributes identified in the image.

* * * * *